June 13, 1950 A. G. KANDOIAN 2,510,982

HIGH-FREQUENCY REACTANCE CIRCUITS

Filed April 19, 1947

INVENTOR.
ARMIG G. KANDOIAN

BY

R P Morris

ATTORNEY

Patented June 13, 1950 2,510,982

UNITED STATES PATENT OFFICE 2,510,982

HIGH-FREQUENCY REACTANCE CIRCUITS

Armig G. Kandoian, Glen Rock, N. J., assignor to Federal Telecommunication Laboratories, Inc., New York, N. Y., a corporation of Delaware Application April 19, 1947, Serial No. 742,645

3 Claims. (Cl. 332—28)

This invention relates to modulating arrangements and more especially to the modulation of ultra high-frequency carriers.

A principal object of the invention is to provide an improved method and apparatus for effecting frequency change or modulation of an ultra high-frequency carrier or micro-wave carrier, in response to signals to be transmitted.

Another principal object is to provide novel circuit arrangements for utilizing variations in the internal conductance of an electron tube to effect frequency change in an ultra high-frequency oscillator.

A further object is to provide an improved frequency shift transmitter of the micro-wave or ultra high-frequency type.

A feature of the invention relates to a signal-controlled frequency changing arrangement for ultra high-frequency oscillators, employing an organization of wave transmission line sections for coupling an electron discharge tube as a signal-controlled reactance to the frequency-determining circuit of the oscillator.

Another feature relates to a micro-wave or ultra high-frequency oscillator which is coupled to a modulator tube of the electron discharge type, in such a way that the variations in resistance or transconductance of the modulator tube appear as substantial corresponding reactance variations in the frequency-determining circuit of the oscillator.

Another feature relates to a novel manner of coupling a diode to an ultra high-frequency oscillator so that variations in internal resistance of the diode cause corresponding substantial changes in the frequency of the oscillator but without undue power variations.

Another feature relates to a novel manner of employing the mutual conductance of a grid-controlled tube to frequency-modulate the output of an ultra high-frequency oscillator.

A further feature relates to an ultra high-frequency oscillator which is coupled to a modulator tube whose internal resistance or transconductance is controlled by signals, the coupling including a transmission line section of less than ¼ wavelength, for example ⅛ wavelength, whereby the said resistance variations are transformed into reactance variations in the tank circuit of the oscillator.

A further feature relates to the combination of an ultra high-frequency oscillator tube and an electron discharge modulator tube, the oscillator and modulator tubes being coupled together for frequency modulation of the oscillator by a transformer of the resonant transmission line type, whose surge impedance is made approximately equal to the average internal impedance of the modulator tube. As a result of this manner of coupling, the internal resistance variations of the modulator tube are transformed into reactance variations in the tank circuit of the oscillator, and the resistive loading on the said tank circuit can be decreased at a much lower rate than is the transformed reactance.

A still further feature relates to an improved coupling arrangement between a modulator triode and an ultra high-frequency oscillator, whereby the grid and plate capacitance of the modulator tube form part of the oscillator tank circuit, while the grid and cathode capacitance form part of a reactance circuit of predetermined fixed reactance, both the tank circuit and the reactance circuit being tuned to resonance at the average value of the transconductance of the modulator tube. As a result of this coupling arrangement, the variations of the said transconductance above and below its average value, in response to signals, causes the said oscillator to vary its frequency substantially above and below an average or mean frequency.

A still further feature relates to the novel organization and interconnection of apparatus whereby substantial changes in an ultra high-frequency oscillator can be obtained without corresponding changes in power.

Other features and advantages will appear from the ensuing description.

Figure 1:
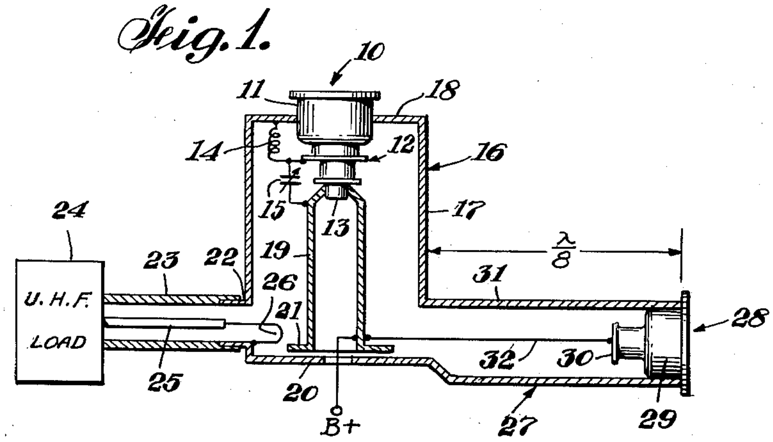
Fig. 1 represents, in schematic form, a frequency-modulated ultra high-frequency oscillator system according to the invention.

Referring to Fig. 1, there is illustrated an ultra high-frequency oscillator tube 10 of any well-known construction capable of generating frequencies of the order of 600 megacycles per second. For example, tube 10 may be of the so-called "light house" construction of which the type 2C40 is typical. Since the internal structure and electrode arrangement of such ultra high-frequency tubes is well-known, the tube is shown in schematic form in the drawing. In general, such a tube comprises an electron-emitting cathode with a suitable heater; a control grid; and an anode or output electrode. The circuit connections for supplying heating current to the cathode are omitted from the drawing and may be of any well-known kind. The cathode is connected to the external metal skirt 11 in the usual way, and the control grid is connected to the external metal disc seal 12, while the anode is connected to the external metal disc seal 13.

In order to cause the tube 10 to act as an oscillator-generator, the grid-to-cathode circuit and the grid-to-plate circuit may be coupled together by suitable inductance 14 and adjustable capacitance 15. The frequency-determining circuit or tank circuit for the tube 10 comprises a cavity resonator or resonant transmission line section 16, comprising the outer tubular conductor 17, within which the tube 10 is fitted so that the cathode skirt 11 is fitted through a central opening in the end wall 18 of the cavity. The anode 13 is likewise fitted within a tubular conductor or pipe 19 which is coaxial within the conductor 17. The positive D. C. potential for the anode of tube 10 is supplied from a suitable source represented schematically by the terminal B+. However, the tubular conductor 19 is D. C. insulated from the bottom wall 20 of the cavity, but is coupled thereto for high frequency waves, for example by means of the annular flange 21 which is spaced from wall 20. A threaded coupling member 22 communicates with the cavity and is arranged to be connected via a coaxial transmission line 23 to a suitable load circuit or device 24, the central conductor 25 of this coaxial line being excited by the oscillator output by means of a small inductive loop 26 in known manner.

Also communicating with the cavity for wave transmission is a transmission line section 27 which, in accordance with the invention, is of less than ¼ wavelength, preferably ⅛ wavelength, so that it acts as a resistance-to-reactance transformer. This transformer line is terminated in a signal-controlled resistance represented by the diode 28 which may be a tube of the type 559 whose electron-emitting cathode is connected to the external metal skirt 29, and whose anode is connected to the metal disc seal 30.

The skirt 29 is fitted into the terminating end of the outer tubular conductor 31 of transformer line 27, and the anode of tube 28 is supplied with positive D. C. potential via the central conductor 32 leading to the D. C power terminal B+. The tube 28 is arranged to have its electronic current flowing between its cathode and anode varied in any well-known manner by signals, for example by changing the D C. bias on its cathode, and therefore these signals are represented by corresponding changes in the internal resistance of the diode. These changes in resistance are not capable of directly modulating the frequency of oscillator 10 to any substantial extent without corresponding variation of the power, because such variations of resistance if directly used to modulate tube 10, would appear as varying resistive loads on the tank circuit of the oscillator. This is undesirable where the oscillator is to have its frequency modulated or shifted without substantial changes in power.

For this reason, and in accordance with the invention, the line 27 is less than ¼ wavelength, and is preferably a ⅛ wavelength line. With such a line, which is in effect terminated in a resistance, namely the resistance of diode 28, the opposite end of the line which is connected to cavity 16, will look like an electrostatic capacity or like an inductance. This will depend upon the magnitude of the impedance of the diode 28 with respect to the impedance of line 27. Also, in accordance with the invention, the line 27 is designed and proportioned so that its surge impedance is equal to the average impedance of the diode 28, which in turn may be correlated with the average or mean frequency of oscillator 10 when the latter is to be used for frequency modulation or frequency-shift transmission. For example, in the case of a diode type 559, the lowest practicable resistance is about 250 ohms, and its average resistance is approximately 700 ohms, and the line 27 should be designed to have an impedance of 70 ohms. However, the line 27 should be tapped on to the cavity or resonant transmission line 16 at a point where the latter has a resistance lower than 70 ohms, e. g., 25 ohms. Consequently, the equivalent resistive loading on the tank circuit of the oscillator will be maximum, as the resistance of diode 28 assumes a value which matches the surge impedance of line 27; and this resistive load will drop off only slowly as the transformed reactance increases.

In one particular circuit organization that was found to produce the desired results, the oscillator 10 with its tank circuit 17 oscillated at a mean frequency of 600 megacycles per second, and using a diode as described coupled to this tank circuit by a ⅛ wavelength line, there were produced substantial shifts of the 600 megacycle signal. Since the impedance of the particular diode used, namely a type 559, could not have its resistance lowered below 250 ohms, the use of the 70 ohm transformer line 27 limited the reactance change on the tank circuit to one of inductance only, but even so there was obtained a change of 1.5 megacycles in the oscillator frequency with no change in power output.

Figure 2:
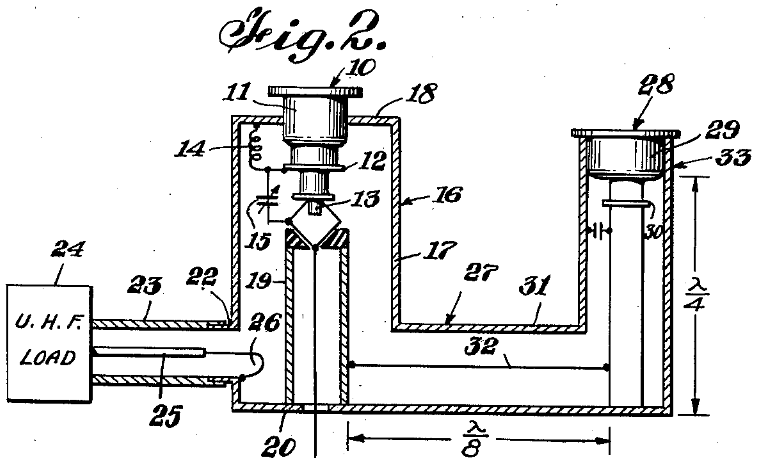
Fig. 2 is a modification of Fig. 1.

In order to obtain the maximum frequency excursions from oscillator 10 with minimum variation in power, an arrangement such as shown in Fig. 2 can be employed. In this embodiment, the parts which are identical with those of Fig. 1 are designated by the same numerals. However, instead of terminating the ⅛ wavelength transformer line 27 directly in the diode 25, the latter is resonated with an intervening ¼ wavelength line section 32. Diode 28 is connected to the line 33 at a point where the impedance of line 33 equals the surge impedance of line 27. With such an arrangement, it is possible to obtain up to 8 or 9 megacycle deviation in the oscillator frequency without substantial power change.

Figure 3:
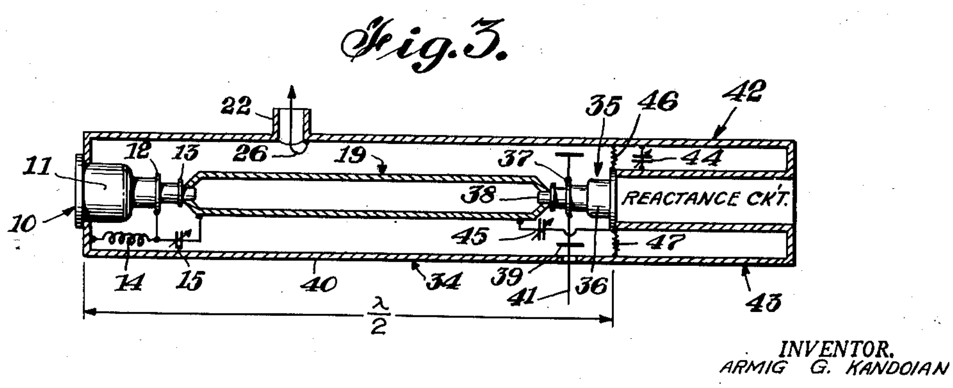
Fig. 3 is an alternative embodiment of the invention.

Instead of modulating the oscillator by employing a fixed coupling and an equivalent reactance variation via the transformer line above described, the oscillator may be frequency modulated by employing a fixed reactance circuit which is coupled to the tank circuit of the oscillator through a controllable coupling. Such an arrangement is schematically shown in Fig. 3, wherein the parts which are identical with those of Fig. 1 bear the same designation numerals. In Fig. 3, the tank circuit of the oscillator tube 10 comprises a one-half wavelength transmission line 34 which is terminated at one end by the oscillator tube 10 and at the other end by the plate and grid inherent reactance of a similar tube 35. The cathode skirt 11 of oscillator 10 is connected to the outer tubular conductor of the half wave line 34, and the anode disc seal 13 is connected to the coaxial tubular conductor 19 of this line. The requisite coupling between the grid-cathode and grid-anode circuits of tube 10 can be obtained by the inductance and condenser 15. The oscillator output is taken off by the small inductive loop 26 in the usual manner.

Coupled to the opposite end of line 34 is the grid-controlled ultra high-frequency amplifier tube 35 which may be of the same type as tube 10. The cathode of this tube is in the usual way connected to the external metal skirt 36; the control grid to the metal disc seal 37; and the anode to the metal disc seal 38. The grid connection 37 is provided with a cylindrical flange 39 which is of smaller diameter than the internal diameter of line conductor 40, so as to D. C. insulate the grid from the line but yet provide the necessary coupling for high frequency wave transmission. In accordance with one aspect of the invention, the electrostatic capacitance between grid and plate of tube 35 forms part of the tank circuit of tube 10. The control grid of tube 35 is connected via conductor 41 to a source of modulating signal voltages (not shown).

This one-half wavelength transmission line tank circuit, terminates in a fixed predetermined reactance circuit, constituted in part of the transmission line sections 42, 43, symmetrically coupled to the control grid and cathode of tube 35 so that the capacitance between said control grid and cathode forms part of this reactance circuit. This reactance circuit is made resonant to the mean or center frequency of oscillator 10 so as to correspond with the average transconductance of tube 35. For this purpose, a separate tuning condenser 44 may be provided. Likewise, the half wave line tank circuit of the oscillator 10 is proportioned and designed to resonate at this same center frequency. A separate coupling condenser 45 may be provided for supplementing the coupling between the fixed reactance circuit and the oscillator tank circuit. A pair of resistors 46, 47, may be provided for loading the cathode circuit of the tube 35, each of these resistances having a value $$R=\frac{C}{\sqrt{\mu}}$$

where C is the capacitance of condenser 45 plus the inherent plate-to-cathode capacitance of tube 35, and $\mu$ is the amplification factor of tube 35. As the modulating potentials are applied to the grid of tube 35, the transconductance of that tube is correspondingly varied and this has the effect of correspondingly varying the effective coupling ratio between the fixed reactance circuit and the tank circuit of the oscillator, with concomitant change in the oscillator frequency. With such an arrangement, if the oscillator 10 has a mean center frequency, for example of 600 megacycles per second, a shift of plus or minus 2 megacycles can be obtained without an undue change in the oscillator power output.

While certain embodiments have been described herein, it will be understood that various changes and modifications may be made therein without departing from the spirit and scope of the invention. Furthermore, the invention is not limited to the particular tube types referred to, and any other well-known high frequency tube can be used.

What is claimed is:

1. A modulating arrangement for an ultra-high frequency oscillator having a transmission line tank circuit and a reactance circuit, comprising an electron discharge device whose plate-cathode electron discharge circuit forms part of said tank circuit and whose grid-cathode electron discharge circuit forms part of the reactance circuit, means for varying the coupling ratio between said reactance circuit and said tank circuit comprising means for varying the transconductance of said device, said transmission line comprising a coaxial transmission line one half wave length long at the oscillator main operating frequency, means coupling the plate electrode of said device to the inner conductor of said line, means coupling the grid electrode of said device to the outer electrode of said line, and means coupling the cathode electrode of said device to the inner conductor of said line and through said reactance circuit to the outer conductor of said line.

2. An arrangement according to claim 1, comprising capacitive means for coupling the grid electrode to the outer conductor of said line.

3. An arrangement according to claim 2, wherein said oscillator comprises an electron discharge device having its plate electrode coupled to the inner conductor of said line, its cathode electrode coupled to the outer conductor of said line at the end of the line remote from said first named discharge device coupling to said line, and means for sustaining oscillations in said oscillator electron discharge device.

ARMIG G. KANDOIAN.

REFERENCES CITED

The following references are of record in the file of this patent:

UNITED STATES PATENTS

| Number | Name | Date |
|---|---|---|
| 2,121,737 | Hansell | June 21, 1938 |
| 2,143,891 | Lindenblad | Jan. 17, 1939 |
| 2,312,919 | Litton | Mar. 2, 1943 |
| 2,421,725 | Stewart | June 3, 1947 |
| 2,438,768 | Stewart | Mar. 30, 1948 |